(12) United States Patent
Loucks

(10) Patent No.: US 12,035,743 B2
(45) Date of Patent: Jul. 16, 2024

(54) METERED MATERIAL FEEDER

(71) Applicant: Kyle Loucks, Vancouver, WA (US)

(72) Inventor: Kyle Loucks, Vancouver, WA (US)

( * ) Notice: Subject to any disclaimer, the term of this patent is extended or adjusted under 35 U.S.C. 154(b) by 498 days.

(21) Appl. No.: 17/468,566

(22) Filed: Sep. 7, 2021

(65) Prior Publication Data
US 2021/0404859 A1 Dec. 30, 2021

Related U.S. Application Data

(63) Continuation-in-part of application No. PCT/US2020/055961, filed on Oct. 16, 2020.

(60) Provisional application No. 62/923,510, filed on Oct. 19, 2019.

(51) Int. Cl.
| | | |
|---|---|---|
| *A24C 5/10* | (2006.01) | |
| *A24C 5/12* | (2006.01) | |
| *A24C 5/46* | (2006.01) | |
| *G01G 13/00* | (2006.01) | |
| *G01G 13/22* | (2006.01) | |
| *G01G 13/28* | (2006.01) | |

(52) U.S. Cl.
CPC ............... *A24C 5/10* (2013.01); *A24C 5/12* (2013.01); *A24C 5/46* (2013.01); *G01G 13/006* (2013.01); *G01G 13/22* (2013.01); *G01G 13/28* (2013.01)

(58) Field of Classification Search
CPC .... A24C 5/10; A24C 5/12; A24C 5/46; A24C 5/44; A24C 5/08; A24C 5/39; A24C 5/18; A24C 5/1807; G01G 13/006; G01G 13/22; G01G 13/28

USPC .......................................................... 177/148
See application file for complete search history.

(56) References Cited

U.S. PATENT DOCUMENTS

| | | | | | |
|---|---|---|---|---|---|
| 2,100,315 | A | * | 11/1937 | Harper .................. | G01G 11/08 241/34 |
| 2,269,432 | A | * | 1/1942 | Beck ...................... | G01G 13/00 222/440 |
| 3,911,933 | A | * | 10/1975 | Crisp ...................... | A24C 5/44 131/51 |
| 4,867,180 | A | * | 9/1989 | Brackmann ............ | A24C 5/39 131/109.2 |
| 4,971,077 | A | * | 11/1990 | Dominguez ........... | A24B 15/30 131/108 |
| 5,513,697 | A | * | 5/1996 | Gudmundsson ....... | F28D 11/02 165/165 |

(Continued)

FOREIGN PATENT DOCUMENTS

| | | | | | |
|---|---|---|---|---|---|
| CN | 106115295 | * | 11/2016 | ............ | B65D 88/68 |
| WO | WO 9111120 A1 | * | 8/1991 | ............ | A24C 5/392 |

*Primary Examiner* — Jacques M Saint Surin

(57) ABSTRACT

A material handling machine dispenses uniformly metered charges of smoking material from a bulk supply, by means of a metered material feeder that has a first hopper with an opening disposed over a first horizontal chute. The first chute is mounted on slanted springs and has a dispensing end above a second chute also mounted upon slanted springs. The second chute discharges onto a tippable weighing tray above a set of nested hoppers in which one is fixed and the other is vertically movable. A weight sensor may be attached to the tippable tray or the fixed hopper, or both. The move-able hopper may comprise a forming belt indenter to form a trough in a cigarette rolling apparatus. The first hopper may include an agitator that has at least one vertical rod for stirring the bulk material. The dispensing end of the first chute may also include a rotating rake.

19 Claims, 3 Drawing Sheets

(56) References Cited

U.S. PATENT DOCUMENTS

| | | | | |
|---|---|---|---|---|
| 5,697,327 | A * | 12/1997 | Pollock | A01K 5/0258 |
| | | | | 119/57.4 |
| 11,059,683 | B1 * | 7/2021 | Prins | B65G 69/12 |
| 11,129,407 | B2 * | 9/2021 | Loucks | A24C 5/08 |

* cited by examiner

METERED MATERIAL FEEDER

CROSS REFERENCE TO RELATED APPLICATIONS

This application is a continuation in part of, claims the benefit of, and claims priority to PCT application Serial No. PCT/US20/055961 "Cigarette Rolling Machine," filed 16 Oct. 2020 and currently pending.

PCT application Serial No. PCT/US20/055961 "Cigarette Rolling Machine," filed 16 Oct. 2020, claims the benefit of U.S. Provisional Patent Application Ser. No. 62/923,510 "Cigarette Rolling Machine," filed 19 Oct. 2020. The entire contents of Provisional Patent Application 62/923,510 "Cigarette Rolling Machine," filed 19 Oct. 2020 and PCT application PCT/US20/055961 "Cigarette Rolling Machine," filed 16 Oct. 2020 are hereby incorporated into this document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates to machinery for retaining a bulk quantity of smoking material and releasing a succession of predetermined amounts for delivery to a cigarette rolling mechanism, so that masses or volumes of delivered material are controlled and substantially identical from one delivery to the next.

BACKGROUND

Rolling cigars and cigarettes is a labor intensive and sometimes delicate activity, especially since smokers prefer sets of cigarettes formed to substantially similar dimensions and containing substantially similar amounts of smoking material in each cigarette. Inventors of machines that automate some or many steps in a cigarette manufacturing process are challenged to create effective means for regulating and delivering measured batches of smoking material to rolling apparatus to produce cigarettes containing substantially similar quantities of smoking material. When sticky material accumulates at intermediate points along the delivery path, a first batch may lack some of the metered material, which then detaches itself to rejoin the material stream adding unexpected quantity to a later batch, causing unwanted variation in batch sizes.

BRIEF DESCRIPTION

A primary objective of the invention is to provide an automated, machine-operated process for metering uniform charges of smoking materials, and delivering these charges to a cigarette forming apparatus.

Another objective of the invention is to collect a bulk mass of smoking material and repeatably apportion predetermined volumes or masses from the bulk, and to deliver these metered portions to a cigarette rolling apparatus.

A corollary objective of the invention is to smooth out the conveying demand between a bulk supply dispenser and the pulsed or intermittent demand of a cyclic production apparatus which only takes in delivered product at one point in its cycle.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Figure 1:
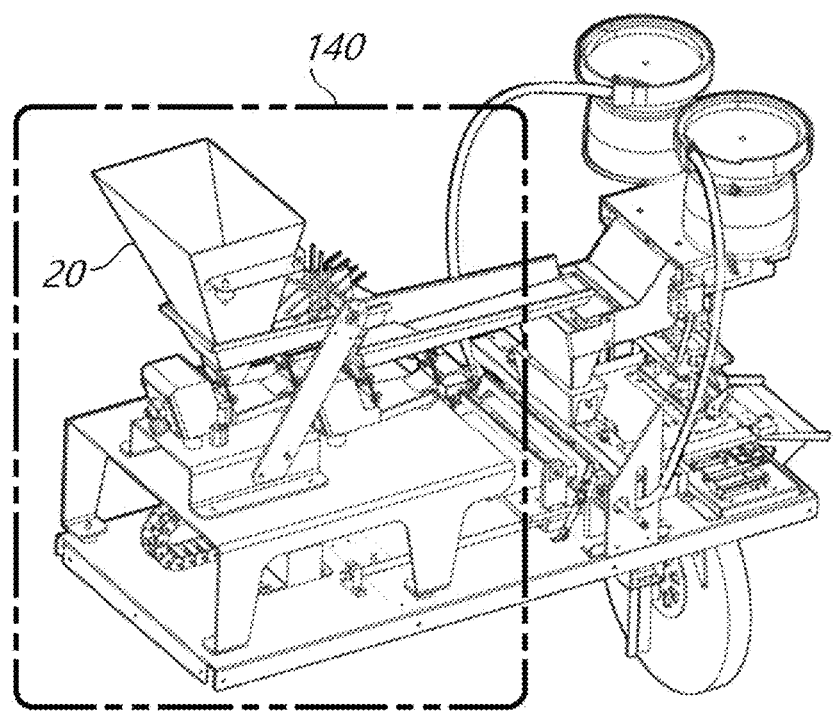
FIG. 1 shows a top front left oblique view of a cigarette rolling apparatus which includes an embodiment of a metered material feeder in accordance with the invention.
Figure 2A:
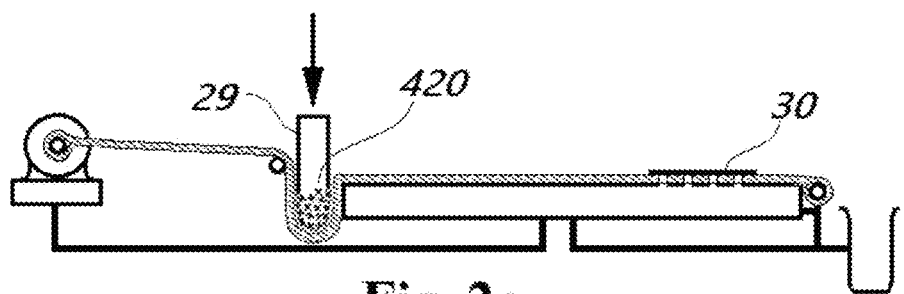
FIG. 2a shows a portion of a cigarette rolling apparatus having a forming belt, and with the smoking material delivered to a trough formed in the belt by an indenter.
Figure 2B:
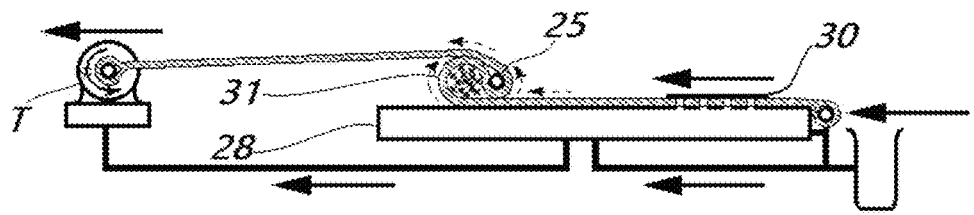
FIG. 2b shows the cigarette rolling apparatus of FIG. 2a during a production step of rolling the smoking material into a cylindrical rolling volume.
Figure 2C:
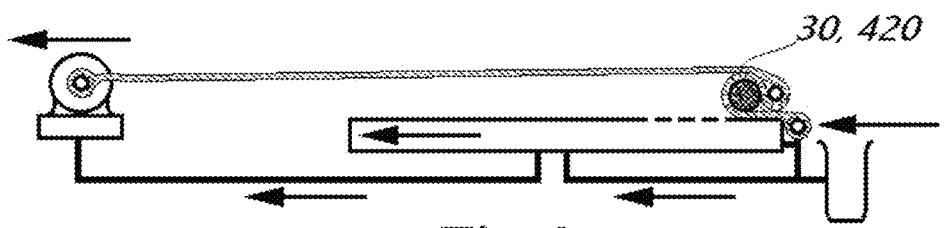
FIG. 2c shows the cigarette rolling apparatus of FIG. 2a during a production step wherein a cigarette paper is inducted into the rolling volume.
Figure 3:
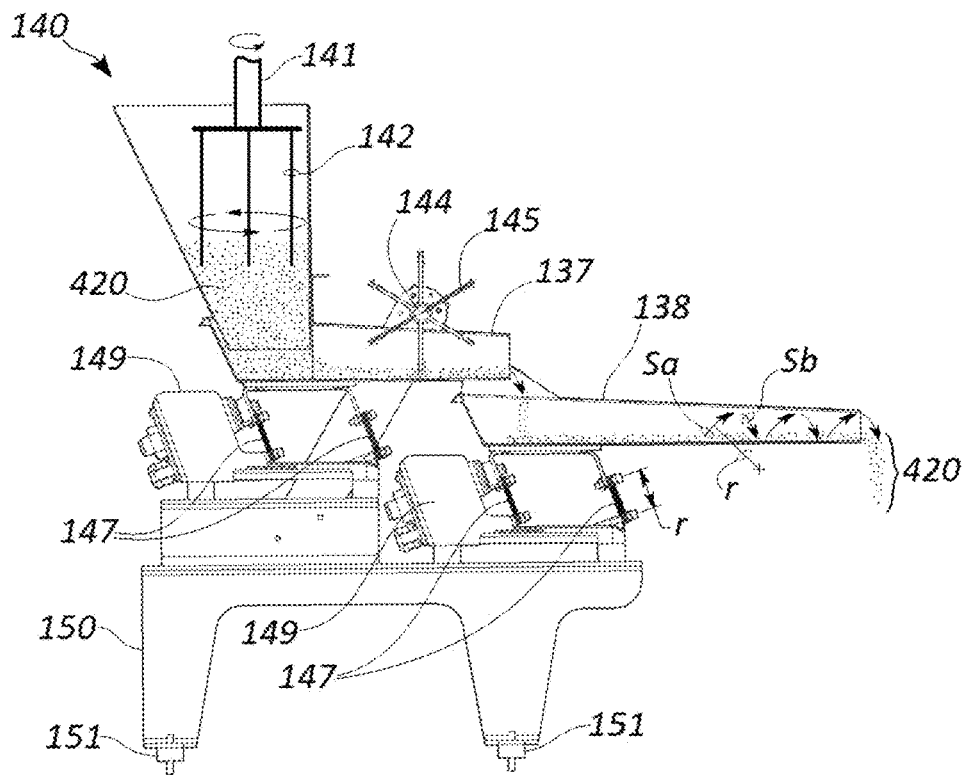
FIG. 3 shows a front cross section view of an embodiment of a metered material feeder in accordance with the invention.
Figure 4:
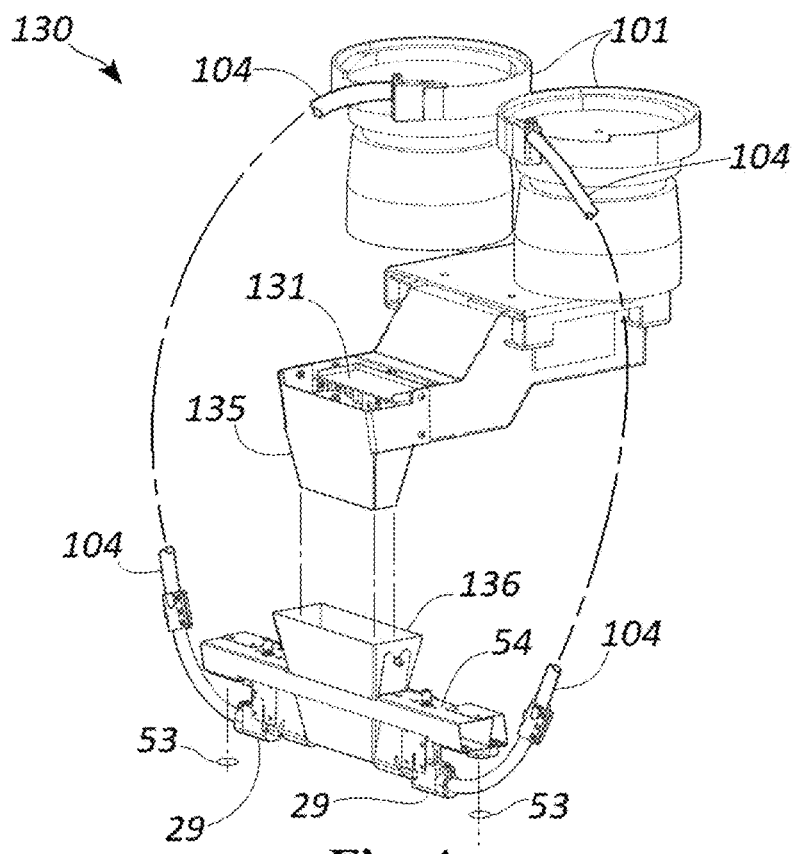
FIG. 4 shows a weighing and indenting subassembly and vibratory bowl system in accordance with the invention.
Figure 5:
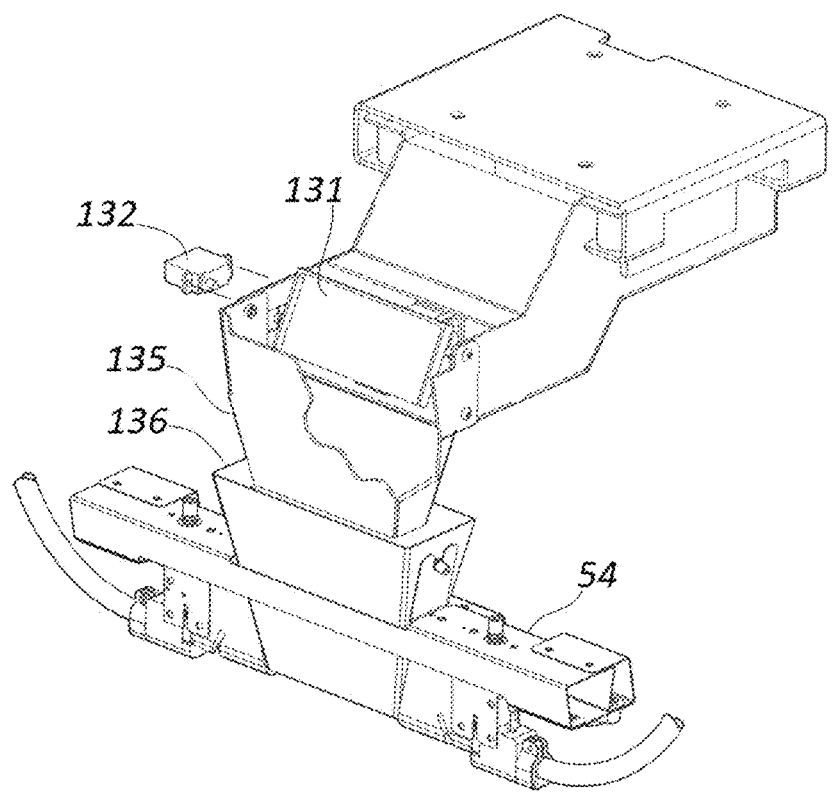
FIG. 5 shows embodiments of a tipping tray, nested hoppers, and indenting subassembly components in accordance with the invention.

For reference:

FIG. 1 in this application is the same as FIG. 6c of the parent application, FIG. 2a in this application is the same as FIG. 2c of the parent application, FIG. 2b in this application is the same as FIG. 2e of the parent application, FIG. 2c in this application is the same as FIG. 2f of the parent application, FIG. 3 in this application is the same as FIG. 7 of the parent application, FIG. 4 in this application is the same as FIG. 8 of the parent application, and FIG. 5 in this application is the same as FIG. 9 of the parent application.

DETAILED DESCRIPTION of CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. Also in this specification, the word "substantially" when modifying words which indicate relative angular orientation, for example "A is substantially perpendicular to B" shall mean that A is within 15° of a theoretical perpendicular direction with respect to B." When modifying scalar or linear dimensions or extensions, an example phrase such as "C is substantially the same length as D" shall mean that length D is greater than or equal to 83% of length C, and less than or equal to 117% of length C.

In this specification the phrase "operably coupled" and its derivative phrases such as "for operably coupling," when used such as "[A] is operably coupled to [B]" means that when [A] is operated then [B] is caused to operate. The operation of [B] in response to [A] may incorporate but not be limited to a direct relation, a proportional relation, or an inverse relation, and time delays may be designed in between the actuation of device or controller [A] and the behavior of [B.] The phrase "[A] is operably coupled to [C] by means of [B]" means that [A] is operably coupled to [B] and [B] is operably coupled to [C,] so that the intermediate component or system [B] may act as a modulating influence on the operation of component or system [C] in response to actuations of device or controller [A.] The operation of [C] in response to [A] may incorporate but not be limited to a direct relation, a proportional relation, or an inverse relation. Time delays may be incorporated between [A] and [B] or between [B] and [C] or both between [A] and [B] and between [B] and [C.]

For sensors or transducers, the phrase "operably coupled" means that a sensor or transducer [B] connected to an object [A,] a signal or property detectable by or at [B] is mathematically related to an event or condition occurring at [A.] The mathematical relation may be a proportional relation or an inverse relation, time delays may occur between the event at [A] and the behavior of [B,] and there also may be known offsets in the signal detected at [B] such as a DC offset voltage or a bias current.

In this specification, words such as "above," "below," "upwards," "downwards," "upon," "atop," "under," "beneath," "up," and "down," and similar words define relative vertical positions and orientations of objects or features as defined by a prevailing gravitational field.

The invention is a material handling machine for dispensing uniformly metered charges of smoking material from a bulk supply, by means of a metered material feeder that has a first hopper with an opening disposed over a first horizontal chute. The first chute id mounted on slanted springs and has a dispensing end above a second chute also mounted upon slanted springs. The second chute discharges onto a tippable weighing tray above a set of nested hoppers in which one is fixed and the other is vertically movable. A weight sensor may be attached to the tippable tray or the fixed second hopper, or both. The moveable hopper may comprise a forming belt indenter to form a trough in a belt of a cigarette rolling apparatus. The first hopper may include an agitator that has at least one vertical rod for stirring the bulk material. The dispensing end of the first chute may also include a rotating rake.

Referring to the figures, FIG. 1 shows a top front left oblique view of a cigarette rolling apparatus which includes an embodiment of a metered material feeder [140] in accordance with the invention. Bulk masses of smoking material are fed into the input hopper [20.] The invention receives bulk masses of smoking material and breaks it up into a material stream which may be intermittently delivered to a rolling apparatus as a cigarette manufacturing step. Smoking material may be tobacco, marijuana, peyote, or other legal materials. Also, the apparatus disclosed herein may also be used for delivering any sort of similar dried or cured plant matter from a bulk quantity to an intermittent packaging step, such as apportioning and delivering tea or coffee for filling single-use packets, or producing quantities of potpourri or scented herb packaged products from bulk masses of herbs.

The schematic representations shown in FIGS. 2a through 2c depict various elements of a particular design of cigarette forming apparatus that manipulates a forming belt to roll up smoking material into a cylindrical volume and introduce a cigarette paper to the perimeter of this rolling volume to form a tubular cigarette. These figures are graphic representations which are to some degree abstract, rather than realistic pictures of particular components. As such they may include oversimplified elements in order to make certain essential information easier to grasp. In so doing, these figures emphasize the functions of various elements albeit while simplifying their particular physical details.

FIG. 2a shows components of a cigarette rolling subassembly of an embodiment of a cigarette rolling machine in accordance with the parent invention. A forming belt rests on a platen, extends between a tensioning spindle, passes over a pinching spindle and ends at a platen spindle. A tensioning motor drives the tensioning spindle by computer command to wind the belt around the tensioning spindle or apply holding torques at various intervals and durations during the cigarette rolling process. A forming belt indenter [29] descends to form a trough in the belt, and a predetermined mass of smoking material [420] is deposited into the trough, and a cigarette paper [30] is delivered to the belt.

FIG. 2b shows the cigarette rolling subassembly of FIG. 2a, with the platen [28] having passed beneath the rolling volume [31] and having displaced it upward to slide along its upper surface. The belt enters the underside of the rolling volume and works its way around the pinching spindle [25] before riding atop of itself as it is being pulled leftward by the tensioning spindle. Heavy-line arrows show the motion of the tensioning spindle and tensioning motor, the platen, platen spindle, and catch basin. Light, broken-line arrows show the motion of the belt in the vicinity of the rolling volume. The torque applied [T] by the tensioning motor may be increased so as to compact the charge of smoking material and reduce the diameter of the rolling volume. Vacuum drawn by a cavity in the platen holds the cigarette paper [30] as it approaches the rolling volume defined by the trough or belly formed in the forming belt.

FIG. 2c shows the cigarette rolling subassembly of FIG. 2a, with the platen and belt continuing to translate so that as the belt passes beneath the rolling volume, the cigarette paper [30] is inducted into the rolling volume, then drawn around the periphery of the cylindrical volume to encapsulate the smoking material [420] into a paper tube.

FIG. 3 shows a front cross section view of an embodiment of a dual-chute vibratory feeder subassembly [140] which is a metered material feeder in accordance with the invention. An agitator [141] includes a rotating plate from which three or a suitable number of vertical rods [142] descend. These rotate near the lower outlet of the input hopper to agitate bulk masses of smoking material [420] so that it drops into the first [137] of two long horizontal channels or chutes mounted on slanted leaf springs [147.] Vibration actuators [149] excite the chutes which are constrained to motions in an arc of radius [r] set by the free flexible length of the slanted leaf springs. Material movement in the upper chute is assisted by a rotating rake [144] and its radial arrays of rake tines [145.] The rake may be located along any part of the first or second chute but is preferably located at the dispensing end of the first chute.

The system moves material from the bulk hopper to a weighing tray described in later figures. Process controllers may be used to energize the upper and lower chute vibration actuators on demand of the weighing tray and the cycling of the dispensing subassembly as part of a kanban delivery regime. Alternatively, the rake may be used to retard delivery of smoking material by non-rotation, slow rotation, or retrograde rotation. Also, although the vibratory motion of the chutes may be effected by slanted leaf springs as shown, substantially equivalent motion of the chutes may be effected by slanted compression or extension springs such as helical springs.

The first chute runs at slower feed rate, while the second horizontal channel or chute [138] operates intermittently on demand from the weighing tray, smoothing out the conveying demand further upstream by buffering the intermittent nature of demand from the lower tray and weighing tray. Operation and halting of the vibratory feed trays is controlled by metered monitoring of product as it accumulates in the weighing tray. Lateral motion of the material in the chutes occurs by saltation in which particles are thrown upwards [Sa] and along the egress direction of the chute as constrained by the radius of the leaf springs in cantilevered flexion, and then descend by gravity [Sb.] The horizontal components of both these motions combine to propagate the material along the egress direction of the chute. Both chutes and their vibratory mechanisms are secured to a chute frame [150] which is attached to the main frame of the machine by vibration absorbing studs [151.]

The relative orientation of these components may be summarized as follows: a first hopper has an opening disposed over a first end of a first horizontal chute [137] with the first horizontal chute mounted upon at least one slanted spring, and with a second end which is a first dispensing end. A second horizontal chute [138] is mounted upon at least one slanted spring, having its first end. beneath the first dispensing end and a second end which a second dispensing end.

FIG. 4 shows a weighing and indenting subassembly and vibratory bowl system [130] in accordance with the parent invention. Filter delivery tubes [104] descend from vibratory bowls [101] to the dispenser subassembly. The sections of tube connecting between the assist manifolds and the dispenser subassembly are called filter stack tubes [104'.] The weighing subassembly includes a tippable weighing tray [131] disposed, beneath. the second dispensing end of the second chute.

The first hopper of the apparatus for receiving bulk material is seen in FIGS. 1 and 3. The tippable tray is poised above a stationary second hopper [135] which nests within a third hopper [136] mounted beneath the second hopper to a main transverse strut called a hopper support bracket [54.] The third hopper is mounded on guides or movable struts or other means for reversable vertical translation so that on a descent, forming belt indenters [29] form a trough in a forming belt as described previously. The rising and descending motions of the dispenser subassembly are driven by the motions of hopper elevating struts [53] shown as phantom line axes.

FIG. 5 shows embodiments of a tipping tray [131,] nested hoppers [135] and [136,] an indenting subassembly, and filter delivery components in accordance with the invention. Precise and accurate weighing may be preferably accomplished using a beam type load cell having four strain gauges and a Wheatstone bridge. A load cell amplifier sends signals for calibration of an empty bucket. A set point programmed into the process controller signals that an indent and roll-up cycle is ready to begin. Weight sensors operably coupled to either the tippable tray or the upper funnel or to both may be used to verify that both emptied completely and that sticky material is not accumulating or left behind, and thus ensure that a complete double dose (typically about 1 gram) of smoking material has been delivered. The weighing sensors are mounted on their own vibration isolators to preserve sensitivity of the load cell. The tipping plate is shown in a tipped position which would precipitate a measured charge of smoking' material into a trough indented into the forming belt. Tipping is accomplished by a tipping motor [132] operably coupled to the tipping tray. The stationary funnel does not touch the movable funnel of the dispensing subassembly.

The dispensing subassembly includes a hopper [136] mounted on a hopper support bracket [54,] and two filter positioners [58] which laterally bestride the dispensing funnel.

Figure 6:
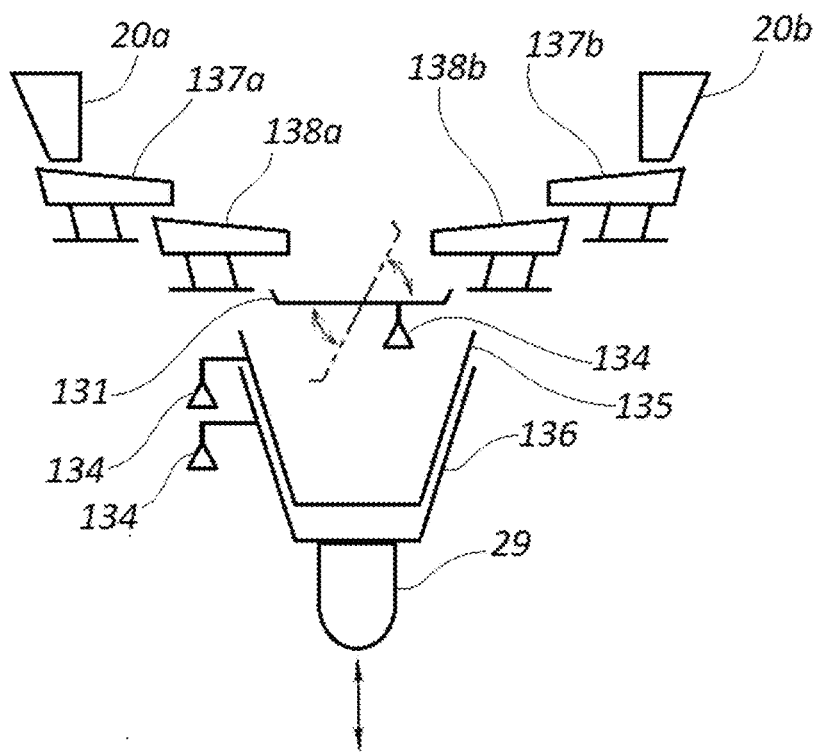
FIG. 6 shows an alternative embodiment of a metered material feeder in accordance with the invention in which the tipping tray and nested hoppers receive materials from more than one bulk supply hopper.

FIG. 6 shows an alternative embodiment of a metered material feeder in accordance with the invention in which the tipping tray and nested hoppers receive materials from more than one bulk supply hopper. The components in this figure are shown as stylized or schematic symbols rather than visual representations. In this embodiment, bulk supply hoppers retain material for independently measuring and delivering two different smoking materials to the tippable weighing tray [131.] The first hopper [20a] deposits material to the first end of a first horizontal channel or chute [137a.] The second end of that chute delivers material to the first end of a second horizontal channel or chute [138a.] The second end of the second chute discharges delivered material onto the tippable weighing tray, which is located above a second hopper [135] which is stationary and nested within a vertically translatable third hopper [136.] The moveable hopper also includes a forming belt indenter [29.]

This embodiment also includes a fourth hopper [20b] with an opening disposed over a first end of a third horizontal chute [137b,] with this third horizontal chute mounted upon at least one slanted spring and having a second end which is a third dispensing end. A fourth horizontal chute [138b] is mounted upon at least one slanted spring so that its first end resides beneath the third dispensing end of the third chute. The second end of the fourth chute is a fourth dispensing end disposed above the tippable weighing tray.

Weight sensors [134] may be operably coupled to any or all from among the tippable weighing tray, the second hopper, and the third hopper. Differential or comparative measurements made before and after chute discharge or after tipping the tray may be used to calculate the amounts of each material delivered to the tray and eventually formed into the cigarettes. These differential measurements may be used to control uniform blend ratios of the two different smoking materials, and may also be used to detect complete discharges of materials from the weighing tray and from the second and third hoppers. For smoking materials which are resinous or sticky, the weight sensors may be used to alert an operator that sticky material may be accumulating on the tray or the hoppers rather than being delivered into the rolling volume for manufacture into cigarettes.

It is also extrapolatable and within the scope of the invention to include additional sets of bulk supply hoppers and associated paired sets of vibratory chutes oriented as tributaries to the weighing tray and the nested second and third hoppers so that cigarettes comprising blends of three or more different smoking materials may be repeatably and reliably produced.

While certain features and aspects have been described with respect to exemplary embodiments, one skilled in the art will recognize that numerous modifications are possible. Further, while various methods and processes described herein may be described with respect to particular structural and/or functional components for ease of description, methods provided by various embodiments are not limited to any particular structural and/or functional architecture. Unauthorized instances of apparatuses and methods claimed herein are to be considered infringing, no matter where in the world they are advertised, sold, offered for sale, used, possessed, or performed.

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A metered material feeder, comprising:
a first hopper with an opening disposed over a first end of a first horizontal chute, said first horizontal chute mounted upon at least one slanted spring and having a second end which is a first dispensing end, a second horizontal chute mounted upon at least one slanted spring having a first end beneath said first dispensing end and a second end which is a second dispensing end, and a tippable weighing tray disposed beneath said second dispensing end.

2. The metered material feeder of claim 1, further comprising a load cell having at least one strain gauge attached to said weighing tray, and a Wheatstone bridge.

3. The metered material feeder of claim 2, wherein said load cell comprises four strain gauges.

4. The metered material feeder of claim 1, further comprising a motor operably coupled to said tippable weighing tray.

5. The metered material feeder of claim 4, further comprising a weight sensor operably coupled to said tippable weighing tray.

6. The metered material feeder of claim 1, further comprising second and third hoppers disposed beneath said tippable weighing tray, in which said second hopper is stationary and said third hopper is disposed beneath said second hopper with means for reversable vertical translation.

7. The metered material feeder of claim 6, wherein said second hopper is nested within said third hopper.

8. The metered material feeder of claim 6, wherein said third hopper further comprises a forming belt indenter.

9. The metered material feeder of claim 6, further comprising a weight sensor operably coupled to said second hopper.

10. The metered material feeder of claim 1, further comprising an agitator disposed within said first hopper, with said agitator comprising at least one vertical rod.

11. The metered material feeder of claim 1, further comprising a rotating rake disposed at said dispensing end of said first horizontal chute.

12. The metered material feeder of claim 1, further comprising
a fourth hopper with an opening disposed over a first end of a third horizontal chute, said third horizontal chute mounted upon at least one slanted spring and having a second end which is a third dispensing end,
a fourth horizontal chute mounted upon at least one slanted spring having a first end beneath said third dispensing end and a second end which is a fourth dispensing end, with said fourth dispensing end disposed above said tippable weighing tray.

13. A metered material feeder, comprising a stationary first hopper with an opening disposed over a first end of a first horizontal chute, said first horizontal chute having a vibratory mechanism operably coupled thereto and said first horizontal chute having a second end which is a dispensing end,
a second hopper nestable within a third hopper having means for reversible vertical translation, and a tippable weighing tray disposed beneath said dispensing end and above said second hopper.

14. The metered material feeder of claim 13, further comprising a weight sensor operably coupled to said tippable weighing tray.

15. The metered material feeder of claim 13, wherein said third hopper further comprises & forming belt indenter.

16. The metered material feeder of claim 13, further comprising a weight sensor operably coupled to said second hopper.

17. The metered material feeder of claim 13, further Comprising an agitator disposed within said first hopper, with said agitator comprising at least one vertical rod.

18. The metered material feeder of Claim 13, further comprising a rotating rake disposed at said dispensing end of said first horizontal chute.

19. The metered material feeder of claim 13, further comprising a fourth hopper with an opening disposed over a first end of a third horizontal chute, said third horizontal chute mounted upon at least one slanted spring and having a second end which is a third dispensing end, a fourth horizontal chute mounted upon at least one slanted spring and having a first end beneath said third dispensing end and a second end which is a fourth dispensing end, with said fourth dispensing end disposed above said tippable weighing tray.

* * * * *